United States Patent
Stokes, III et al.

(10) Patent No.: US 7,925,007 B2
(45) Date of Patent: Apr. 12, 2011

(54) MULTI-INPUT CHANNEL AND MULTI-OUTPUT CHANNEL ECHO CANCELLATION

(75) Inventors: Jack W. Stokes, III, North Bend, WA (US); John Platt, Redmond, WA (US)

(73) Assignee: Microsoft Corp., Redmond, WA (US)

( * ) Notice: Subject to any disclaimer, the term of this patent is extended or adjusted under 35 U.S.C. 154(b) by 1706 days.

(21) Appl. No.: 11/150,017

(22) Filed: Jun. 10, 2005

(65) Prior Publication Data

US 2006/0002546 A1 Jan. 5, 2006

Related U.S. Application Data

(63) Continuation-in-part of application No. 10/883,128, filed on Jun. 30, 2004, now Pat. No. 7,352,858.

(51) Int. Cl.
*H04M 9/08* (2006.01)

(52) U.S. Cl. ......... 379/406.08; 379/406.05; 379/406.13; 379/406.14

(58) Field of Classification Search . 379/406.01–406.16
See application file for complete search history.

(56) References Cited

U.S. PATENT DOCUMENTS

| | | | |
|---|---|---|---|
| 6,246,760 B1 * | 6/2001 | Makino et al. ........... | 379/406.08 |
| 6,408,269 B1 * | 6/2002 | Wu et al. ................. | 704/228 |
| 6,553,122 B1 | 4/2003 | Shimauchi et al. | |
| 6,556,682 B1 * | 4/2003 | Gilloire et al. .......... | 381/66 |
| 6,842,516 B1 | 1/2005 | Armbruster | |
| 7,299,251 B2 * | 11/2007 | Skidmore et al. ......... | 708/322 |
| 2004/0131197 A1 | 7/2004 | Le Tourneur et al. | |
| 2004/0179387 A1 | 9/2004 | Abraham | |
| 2005/0002468 A1 | 1/2005 | Walton et al. | |
| 2005/0009486 A1 | 1/2005 | Al-Dhahir et al. | |
| 2005/0157866 A1 * | 7/2005 | Marton et al. ........... | 379/406.08 |
| 2006/0034355 A1 * | 2/2006 | Auvray et al. ............. | 375/219 |

FOREIGN PATENT DOCUMENTS

| WO | WO2004098088 | 4/2004 |
|---|---|---|
| WO | WO2005002184 | 1/2005 |

OTHER PUBLICATIONS

Herbert Buchner, "Multichannel Acoustic Echo Cancellation", http://www.lnt.de/lms/research/projects/echo/mcaec.html, May 25, 2005, pp. 1-3.

(Continued)

*Primary Examiner* — Fan Tsang
*Assistant Examiner* — Ibraham Sharifzada
(74) *Attorney, Agent, or Firm* — Lyon & Harr, LLP; Katrina A. Lyon

(57) ABSTRACT

An echo cancellation technique that can process multi-input microphone signals with only a small increase in the overall CPU consumption compared to implementing the algorithm for a single channel microphone signal. Furthermore, the invention provides an architecture that provides for echo cancellation for multiple applications in parallel with only a small increase in CPU consumption compared to a single instance of echo cancellation with a single microphone input and multi-output channel playback.

18 Claims, 11 Drawing Sheets

OTHER PUBLICATIONS

A. Usher, B. Cooperstock, C. Woszczyk, "Perceptual Audio Coding Using Adaptive Pre and Post-Filters and Lossless Compression", IEEE Transactions on Speech and Audio Processing, vol. 10, No. 6, pp. 379-390, Sep. 2002.

W. Kellermann, H. Buchner, Wolfgang Herbordt, R. Aichner, "Multichannel Acoustic Signal Processing for Human/Machine Interfaces Fundamental Problems and Recent Advances", International Conference on Acoustics (ICA), Kyoto, pp. 1-8, 2004.

W. Herbordt, H. Buchner, W. Kellerman, "An acoustic human-machine front-end for multimedia applications", pp. 1-24, Nov. 13, 2002.

A. John Usher, B. Jeremy Cooperstock, C. Woszczyk, "A Multi-Filter Approach to Acoustic Echo Cancellation for Teleconferencing", pp. 1-4.

* cited by examiner

MULTI-INPUT CHANNEL AND MULTI-OUTPUT CHANNEL ECHO CANCELLATION

CROSS REFERENCE TO RELATED APPLICATIONS:

This application is a continuation-in-part of U.S. patent application Ser. No. 10/883,128, filed on Jun. 30, 2004, now U.S. Pat. No. 7,352,858 and entitled "MULTI-CHANNEL ECHO CANCELLATION WITH ROUND ROBIN REGULARIZATION".

BACKGROUND

Related Art

Echo cancellation is an important element in a variety of applications. In general, echo cancellation is the digital cancellation of electrical and acoustic echoes such that the echoes are attenuated or eliminated. Echo cancellation is essential in applications such as communications systems, where it is used to improve sound quality. Echo cancellation is used to overcome several different types of echoes, including hybrid echoes, caused by an impedance mismatch along an electrical line (including a telephone line), and acoustic echoes, caused by acoustic coupling of sound from a loudspeaker to a microphone. These types of echoes appear in several different technologies, such as wireless telephony, hands-free telephony, teleconferencing systems, Internet telephony, and speech recognition systems. By using echo cancellation, the sound quality and usefulness of these and many other technologies is improved.

One type of echo cancellation is acoustic echo cancellation, which is used to cancel out the echoes of acoustic sound waves. Typically, these echoes are formed when sound emitted by one or more loudspeakers is picked up by one or more microphones. Acoustic echoes can be quite noticeable and even annoying to a user.

In general, acoustic echo cancellation works by obtaining one or more playback signals, each going to corresponding loudspeakers and subtracting an estimate of the echo produced by that playback signal from the one or more microphone signals. More specifically, the playback signals through this echo loop are transformed and delayed, background noise and possibly near end speech are added at the microphone, and a subtraction process for the echo cancellation is used. The signal obtained after subtraction is called the error signal, and the goal is to minimize the error signal when no near end speech is present in the microphone signal.

The heart of acoustic echo cancellation system is adaptive filtering. The adaptive filter has a task of estimating/predicting the echo in order to eliminate it once it occurs within the input signal Y. In general, an adaptive filter is used to identify or "learn" a transfer function of the room that contains the loudspeakers and microphones. This transfer function will depend a great deal on the physical characteristics of the room environment. The adaptive filter works by taking the playback signal sent to the speakers and adjusting in a recursive manner some coefficients that represent an impulse response of the room. The error signal, which is the estimated echo subtracted from the actual echo, is used to change the filter coefficients such that the error is minimized.

Traditionally, the playback signals are each processed as a single stream of temporal samples, with a single delay line and a single filter. To improve upon this, the playback signal can be split into subbands and a plurality of adaptive filters can be run in parallel, one adaptive filter per subband. The adaptive filters for the lower, subbands can be made longer in order to save CPU computation cycles because the bass tends to reverberate longer. In the upper subbands, the filters can be shorter. Thus, longer adaptive filters in the lower subbands and shorter adaptive filters in the higher subbands can be used.

To cancel the echoes in a captured signal, each subband of the playback signal is stored in a digital delay line, where the delayed subband signals are separated into taps. At each tap, the playback signal is sampled. The number of taps of a filter describes the length of the digital delay line. For example with an adaptive filter, four taps means that the playback signal is sampled at the current frame, current frame-1, current frame-2, and current frame-3. Each of the delays is equal to the frame length (which can be, by way of example, approximately 16 milliseconds or 20 milliseconds). Thus, if the frame length is 16 ms, and there are four taps (or a 4-long adaptive filter), and if the adaptive filters are implemented using adaptive subband filtering in the frequency domain, the playback signal is examined at a current frame, the frame 16 ms earlier, the frame 32 ms earlier, and the frame 48 ms earlier than the current frame.

Each playback signal sample gets multiplied by the complex conjugate of a weight (called a tap weight, W), the multiplied weight is summed, and then is subtracted from the microphone signal. Each tap weight is adjusted to minimize the output power. Minimizing the output power suppresses as much of the speaker signal as possible, thereby reducing echoes.

In a typical embodiment, the adaptive filter uses a normalized, least mean square (NLMS) algorithm having regularization. When dividing one number by a second number, regularization is the process of adding or subtracting a small value to the denominator to ensure that the denominator never becomes zero, which in turn would cause the fraction to become infinite. An alternative way to regularize the fraction is to set the denominator equal to some threshold if the denominator is positive and less than the threshold. Likewise, if the denominator is negative, set the denominator to a negative threshold if it is greater than the negative threshold.

While the NLMS algorithm works well for the mono acoustic echo cancellation (AEC) problem, NLMS performs poorly in the stereo (or other multi-channel) AEC problem. This is because NLMS does not consider the cross-channel correlation of the multi-channel playback signal which significantly slows down the convergence of the adaptive filters.

Recursive least squares (RLS) instead of NLMS has been used to solve the stereo AEC problem. The RLS algorithm is an alternative algorithm for adjusting the parameters (or weights) of the adaptive filters. The reason RLS works better than NLMS is that RLS tends to decorrelate the playback channels. Since RLS recursively computes an estimate of the inverse of a correlation matrix of the input speaker data, it can learn the correlation between the speaker channels and quickly converge to the correct solution.

However, one problem with the RLS algorithm for computing the adaptive filter weights is that it has a high computational complexity. This complexity is on the order of $O(2N^2+6N)$ compared to $O(2N)$ for the least mean squares (LMS) where $N=C*L$, C is the number of playback channels, and L is the adaptive filter length in the subband. Previously, this computational complexity of RLS prohibited its use in AEC in practical systems. Using a fast RLS (FRLS) for stereo AEC has been suggested, however. FRLS increases the speed and decreases the complexity of RLS by avoiding the use of a correlation matrix (or any other types of matrices). One problem, however, with FRLS is that it is quite unstable. As a result of this instability, the FRLS algorithm can quickly diverge. There have been several attempts to improve the stability of FRLS. However, to date, no one has come up with a satisfactory solution for the multi-channel AEC problem.

In order to decorrelate the left channel from the right channel (which were very similar) in a stereo AEC problem, it was proposed to add a nonlinearity to both channels. In one implementation, the positive portion of the nonlinearity was added to one channel and the inverse (or negative) portion of the nonlinearity was added to the other channel. This introduced nonlinearity forced the channels to be different enough that the adaptive filters could learn the individual paths. In this way, the channels were decorrelated and made different enough so that the non-uniqueness problem associated with having to track the far-end transfer functions from the far-end person to far-end stereo microphones, as well as the near-end transfer functions from the near-end speakers to the near-end microphones, could be avoided. The problem with adding a nonlinearity to the signal in this manner is that adding any type of the nonlinearity tends to distort the signal. Basically, adding a nonlinearity is adding distortion to the signal. Adding distortion, however, is undesirable if the AEC system is to work well with a system that involves music playback. Ideally, for music playback, the signal should be free of distortion so that the music is played back faithfully.

Due to its computational complexity discussed previously, RLS was not a practical solution for the multi-channel AEC problem in the past. However, with the significant increase in speed of modern microprocessors, RLS can now be used. However, the RLS algorithm will become unstable and diverge if the correlation matrix of the multi-channel playback signal becomes singular.

Furthermore, due to the algorithmic complexity of many multi-channel AEC algorithms, CPU consumption can be prohibitive for running multiple implementations in parallel. For example, an acoustic echo cancellation algorithm for canceling the echo created when a multi-channel signal is played through the computer's speakers and simultaneously recorded by the microphone(s) can be very complex and CPU intensive.

SUMMARY

The multi-input channel, multi-output channel echo cancellation system and method of the invention provides a method for processing the input from multiple microphones with only a small increase in the overall CPU consumption compared to implementing the algorithm for a single channel microphone signal. Furthermore, one embodiment of the system and method of the invention provides an architecture that allows the method for processing multiple input signals to also be run for multiple applications in parallel with only a small increase in CPU consumption compared to a single instance of an acoustic echo cancellation with a single microphone input and multi-output channel playback.

The system and method of the invention provides:
1) An improved echo cancellation technique (e.g. acoustic echo cancellation technique) for multi-input channel capture and multi-output channel playback signals.
2) An improved echo cancellation (e.g., acoustic echo cancellation) system architecture for multiple applications running with multi-output channel playback and one or more capture channels.

The system and method of the invention minimizes the number of computations necessary by only requiring one gain vector computation for each subband, even though the number of adaptive filters employed is equal to the number of input channels times the number of subbands.

The multi-input channel, multi-output channel echo cancellation system cancels echoes by decomposing each of a plurality N of speaker playback signals into a plurality M of subband signals and computing a single gain vector for all N speaker signals of each subband M. The gain vector can be computed using an inverse correlation matrix and the plurality of N speaker signals for each subband, and is independent of any microphone inputs. A plurality of C microphone inputs are input and a plurality of adaptive filters are applied to the plurality of subband signals corresponding to the plurality of C microphone inputs using said single gain vector for each subband to reduce the echo in the plurality of microphone inputs using the outputs of the plurality of adaptive filters. In one embodiment, each of the plurality of adaptive filters is selected in a round robin sequence, and an inverse correlation matrix of each selected adaptive filter is regularized in order to ensure that the each of the adaptive filters is stable. Various adaptive filters can be used, such as, for example, recursive least squares (RLS) adaptive filters, fast recursive least squares filters (FRLS) and normalized least mean squares (NLMS) adaptive filters. Besides being applicable to acoustic echo problems, the invention can equally well be applied to electrical signals.

The system and method of the invention also includes an improved echo cancellation (e.g., acoustic echo cancellation) system architecture for multiple applications running with multi-output channel playback and one or more capture channels. This embodiment eliminates echoes of a plurality of playback signals in a captured signal by decomposing the plurality of playback signals into subbands, and computing a gain vector for each subband using inverse correlation matrices, wherein the gain vector and the inverse correlation matrices are independent of the captured signal. Then, at more than one output device, the playback signals are processed using an adaptive filter for each of the subbands using the gain vector computed for that subband; and the echoes in the captured signal are reduced using the outputs of the adaptive filters. The reduced echoes in the captured signal can be computed by multiple applications and several copies of the updated gain vector are sent to each of the applications. However, the gain vector and the inverse correlation matrices are only updated once for each output device.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
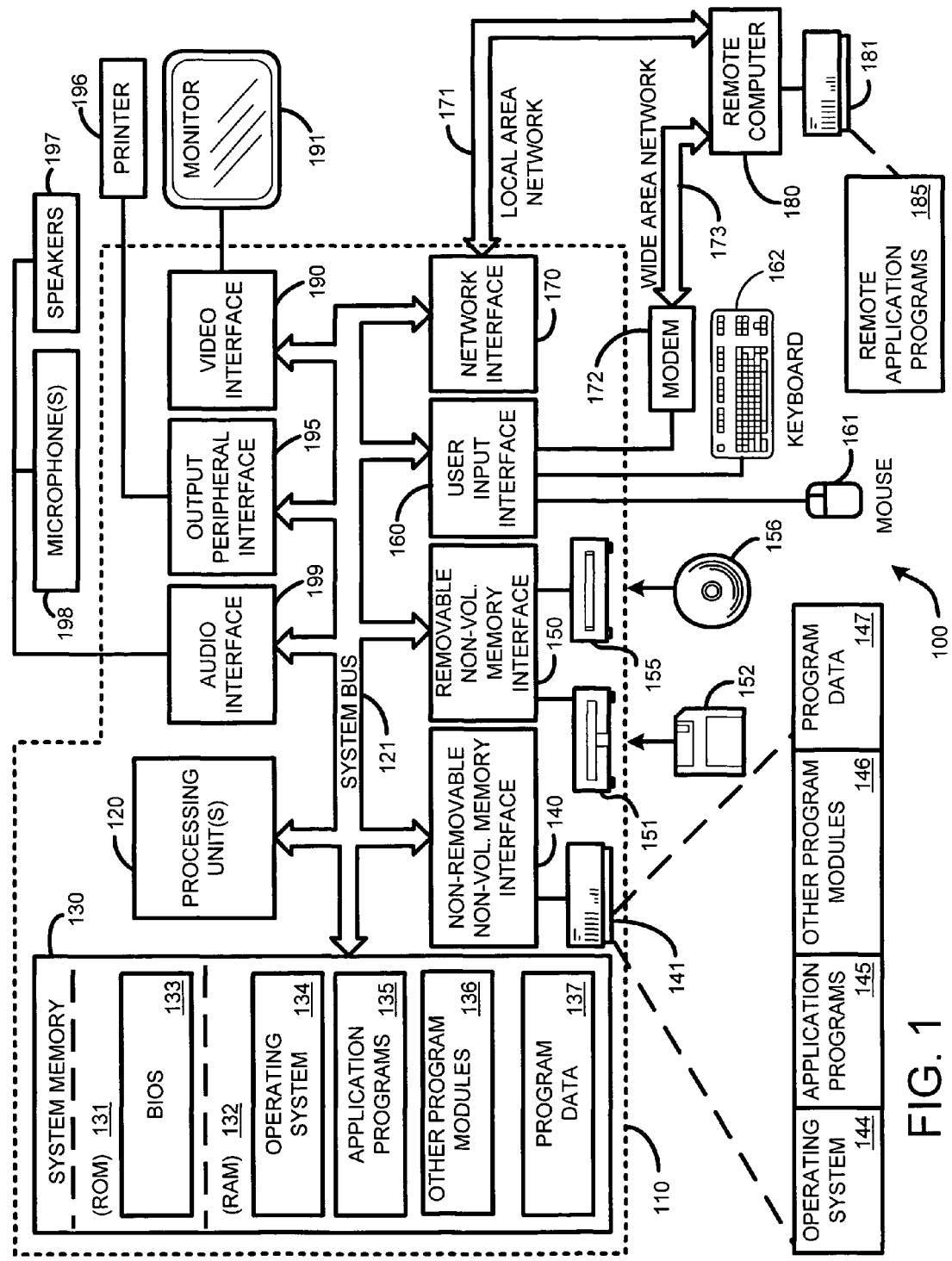
FIG. 1 is a general system diagram depicting a general-purpose computing device constituting an exemplary system wherein the system and method of the invention can be practiced.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with hardware modules, including components of a microphone array 198. Generally, program modules include routines, programs, objects, components data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver, and a television or broadcast video receiver, or the like. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 110 may also include a speech or audio input device, such as a microphone or a microphone array 198, as well as a loudspeaker 197 or other sound output device connected via an audio interface 199, again including conventional wired or wireless interfaces, such as, for example, parallel, serial, USB, IEEE 1394, Bluetooth™, etc.

A monitor 191 or other type of display device is also connected to the system bus 121 via an interface, such as a video interface 190. In addition to the monitor, computers may also include other peripheral output devices such as a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the multi-input channel and multi-output channel echo cancellation system and method of the invention.

2.0 A System and Method for Multi-Input Channel and Multi-Output Channel Acoustic Echo Cancellation for Microphone Arrays and Multiple Applications:

In this section, the details of an improved echo cancellation, for example acoustic echo cancellation (AEC), method for multi-input channel capture, such as would be used with microphone arrays, are provided. Additionally, an improved echo cancellation system architecture for multiple applications running with multi-output channel playback and one or more capture channels is discussed.

2.1 Overview of the Multi-Input Channel, Multi-Output Channel Echo Cancellation System.

Figure 2:
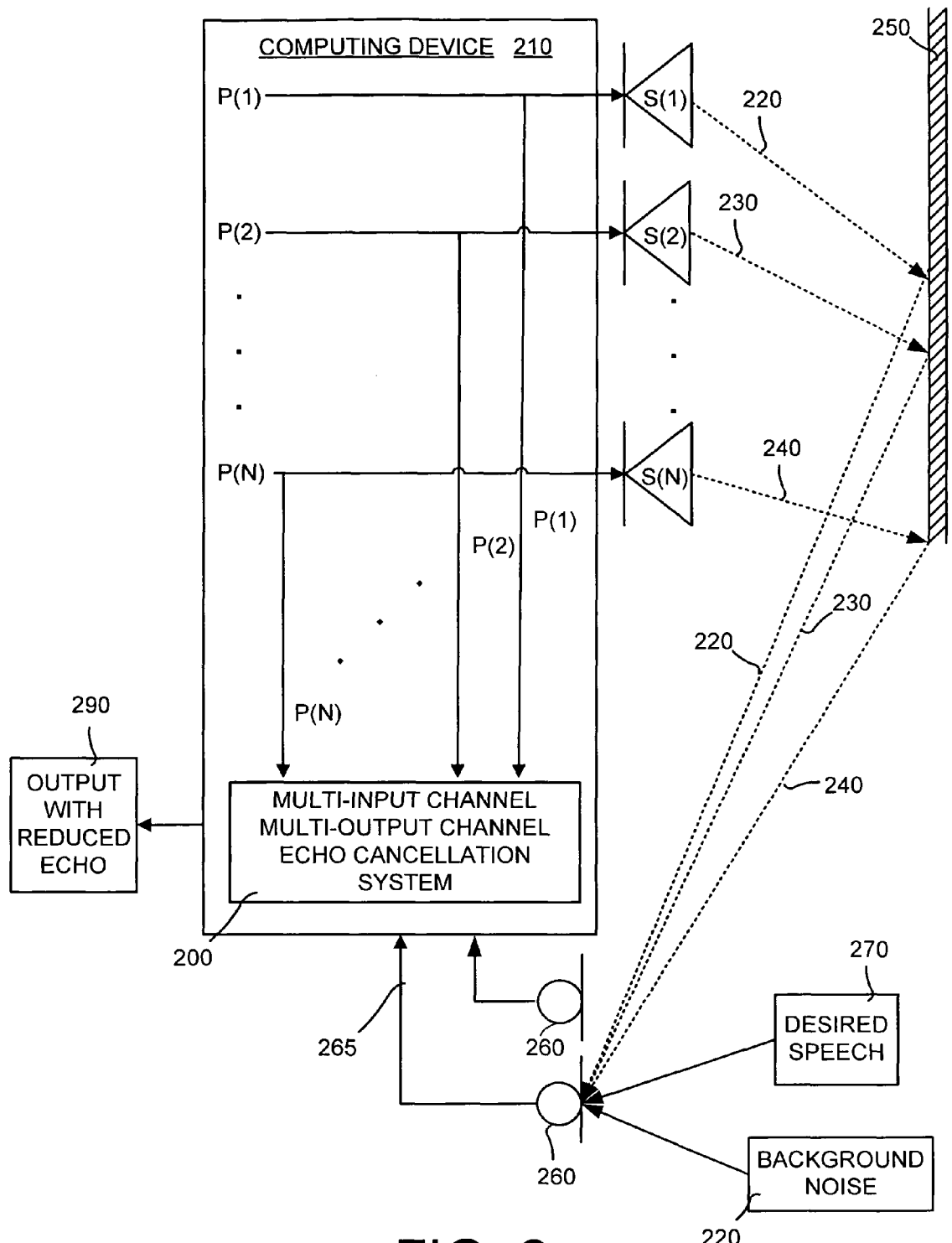
FIG. 2 is a block diagram illustrating an exemplary implementation of the multi-input channel and multi-output channel echo cancellation system and method disclosed herein.

FIG. 2 is a block diagram illustrating an exemplary implementation of the multi-input channel, multi-output channel echo cancellation system and method disclosed herein. It should be noted that FIG. 2 is one of several ways in which the multi-input channel, multi-output channel echo cancellation system and method may implemented and used.

Referring to FIG. 2, the multi-input channel, multi-output channel echo cancellation system 200 resides on a computing device 210. In FIG. 2, playback signals P(1), P(2) to P(N) are generated internally (such as music from a compact disk) by the system 200. In an alternate embodiment, playback signals P(1), P(2) to P(N) are external and received (such as via input audio jacks) by the system 200. Each playback signal is played back over its respective speaker, so that P(1) is played back through speaker S(1), P(2) is played back through speaker S(2), and so forth. In addition, the playback signals P(1) to P(N) are obtained and input into the multi-input channel, multi-output channel echo cancellation system 200.

For example, for one microphone of the microphone array, as shown by the dotted lines in FIG. 2, the output of the speakers S(1) to S(N) causes echoes 220, 230, 240 to be reflected off a wall 250 of a room (not shown). These echoes 220, 230, 240 are picked up by the microphone 260. In addition, the microphone picks up desired speech 270 and background noise 280. The signal from the microphone 265, also called the "captured signal", along with the outputs of the playback signal P(1) to P(N), are input to the multi-input channel, multi-output channel echo cancellation system 200. After processing by the multi-input channel, multi-output channel echo cancellation system 200, a new output signal 290 is generated. Output signal 290 is the captured signal 265 with echoes of speaker signals 220, 230, and 240 reduced. The computing device 210 is connected to a plurality of receivers 260, producing a plurality of signals 265. Each of the plurality of signals 265 is operated on by the multi-input channel, multi-output channel echo cancellation system and method 200.

It should be noted that the invention is not limited to acoustic signals. For example, it is equally applicable to hybrid echoes caused by an impedance mismatch along an electrical line such as those encountered in the standard telephone network (plain old telephone system or POTS) or in ADSL (Asymmetric Digital Subscriber Line) networks.

2.2 Background.

In a previous co-pending patent application entitled MULTI-CHANNEL ECHO CANCELLATION WITH ROUND ROBIN REGULARIZATION, assigned Ser. No. 10/883,123 and filed on Jun. 30, 2004, a multi-channel speaker AEC algorithm was proposed. That patent application disclosed a multi-channel echo cancellation system and method having round robin regularization, that can be used on both mono and multi-channel capture and playback signals. In particular, the round robin regularization ensures that the adaptive filter algorithm does not become singular and unstable by regularizing the correlation matrix of the adaptive filter algorithm. This regularization is performed in a round robin fashion. In other words, the inverse correlation matrix of the subband playback data associated with each adaptive filter is regularized, in a round robin sequence, to prevent the inverse correlation matrix from diverging. In an alternative embodiment, each inverse correlation matrix is examined for divergence. If the inverse correlation matrix starts to diverge, then the matrix is regularized. The multi-channel round robin regularization echo cancellation method described in the aforementioned patent application includes obtaining a captured signal containing echo of a plurality of playback signals. The plurality of playback signals are decomposed into a plurality of subbands, and a plurality of adaptive filters are applied to the subbands. Each adaptive filter has an inverse correlation matrix. Next, each one of the plurality of adaptive filters is selected in a round robin sequence, so that every round each of the filters is selected. The inverse correlation matrix associated with each selected adaptive filter then is regularized. The regularized adaptive filter then is used to remove the echo from the captured signal.

For multi-channel speaker signals, the above discussed algorithm is mathematically given by:

$$P(0,m) = \delta^{-1}I$$

$$\hat{w}(0,m) = 0$$

RoundRobinCount = 0

For each frame n=1, 2, ..., compute the Kalman gain vector K(m), ξ(n,m) error, $\hat{W}(n,m)$ tap weight vector of the signal correlation matrix and inverse correlation matrix P(n,m) as:

--- for each subband m = 0 ... M−1

$$K(m) = \frac{\lambda^{-1}P(n-1,m)X(n,m)}{1 + \lambda^{-1}X^H(n,m)P(n-1,m)X(n,m)}$$

ξ(n,m) = Y(n,m) − $\hat{W}^H$(n,m)X(n,m)
$\hat{W}$(n+1,m) = $\hat{W}$(n,m) + K(m)ξ*(n,m)
P(n,m) = $\lambda^{-1}$P(n−1,m) − $\lambda^{-1}$K(m)X$^H$(n,m)P(n−1,m)
if (m == RoundRobinCount)
  R(n,m) = P$^{-1}$(n,m)
  R(n,m) = R(n,m) + β$_{RLS}$I
  P(n,m) = R$^{-1}$(n,m)
end
end
RoundRobinCount = RoundRobinCount + 1
if (RoundRobinCount == MaxRoundRobinCount)
  RoundRobinCount = 0
end

--- where δ is a small constant, I is the identity matrix, $$K(m) = [K(m,0) \ldots K(m,C*L-1)]^T$$

is the multi-channel Kalman gain vector, C is the number of playback channels, L is the filter length in the subband, $$X(n,m) = [X(n,m,0) \ldots x(n,m,C-1) X(n-1,m,0) \ldots X(n-L+1,m,C-1)]^T$$

is the multi-channel speaker input vector, P(n,m) is the inverse of the input speaker signal correlation matrix R(n,m), $$R(n,m) = \sum_{i=0}^{n} \lambda^{n-i} X(n,m) X^H(n,m)$$

λ is the exponential forgetting factor, and $$\hat{W}(n,m) = [\hat{W}(n,m,0) \ldots \hat{W}(n,m,C-1) \hat{W}(n31\,1,m,0) \ldots \hat{W}(n-L+1,m,C-1)]^T$$

is the tap weight vector, Y(n,m) is the microphone signal, ξ is the error signal between the microphone signal and the estimated echo, ξ* is the conjugate of the error, and β$_{RLS}$ is the regularization factor. ξ is the output of the algorithm: the microphone signal with the speaker echo substantially reduced. ξ can be converted back to the time domain, as appropriate for the application.

In this co-pending patent application it was proposed that the algorithm be run separately and independently for each signal captured from the microphone inputs in a microphone array. Running such an algorithm separately and independently for each signal captured from the microphone inputs in a microphone array is time-consuming and is not very computationally efficient, however. Furthermore, it requires gain vector computations equal to the number of microphone channels times the number of subbands.

2.3 Method of Multi-Input Channel and Multi-Output Channel Cancellation.

Figure 3:
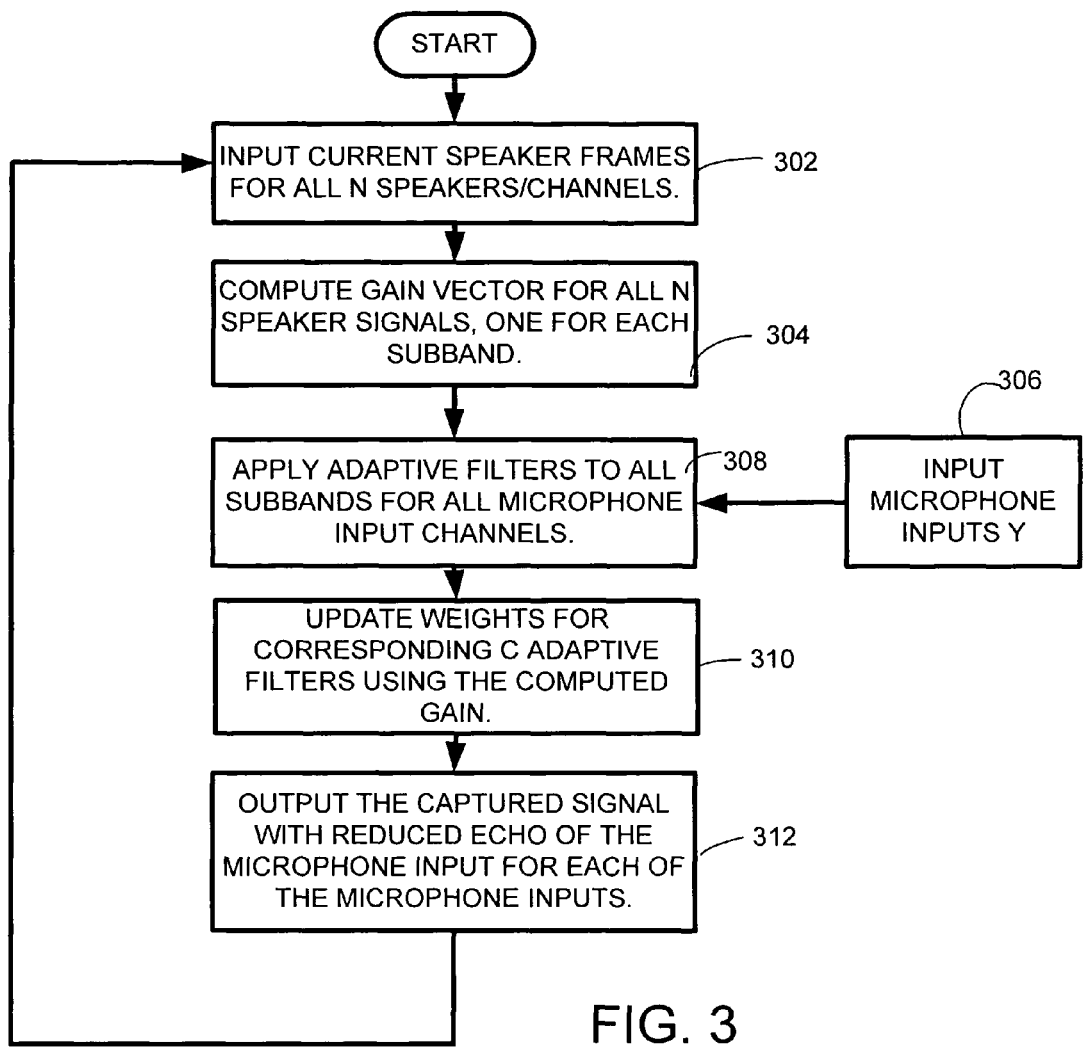
FIG. 3 is a high level flow diagram of the operation of the echo cancellation system of the invention.

In the most general sense, the echo cancellation method of the invention is shown in FIG. 3. As shown in process action 302, the current N speaker frames (e.g., stereo output channels) for all N speaker channels are input. A gain vector for each subband is then computed for the N speaker signals as shown in process action 304. The length of the gain vector depends on the length of the echo cancellation filter, L, and the number for speaker signals N. The microphone inputs Y for C microphone capture channels are input (process action 306), and then the adaptive filters are applied to all microphone input channels for all subbands using the single gain vector computation per subband (process action 308). The weights for the C adaptive filters are then updated using the computed gain vector (process action 310). Then the captured signal with reduced echo is output for each of the microphone inputs, as shown in process action 312. This process is repeated for the next set of speaker frames.

Figure 4:
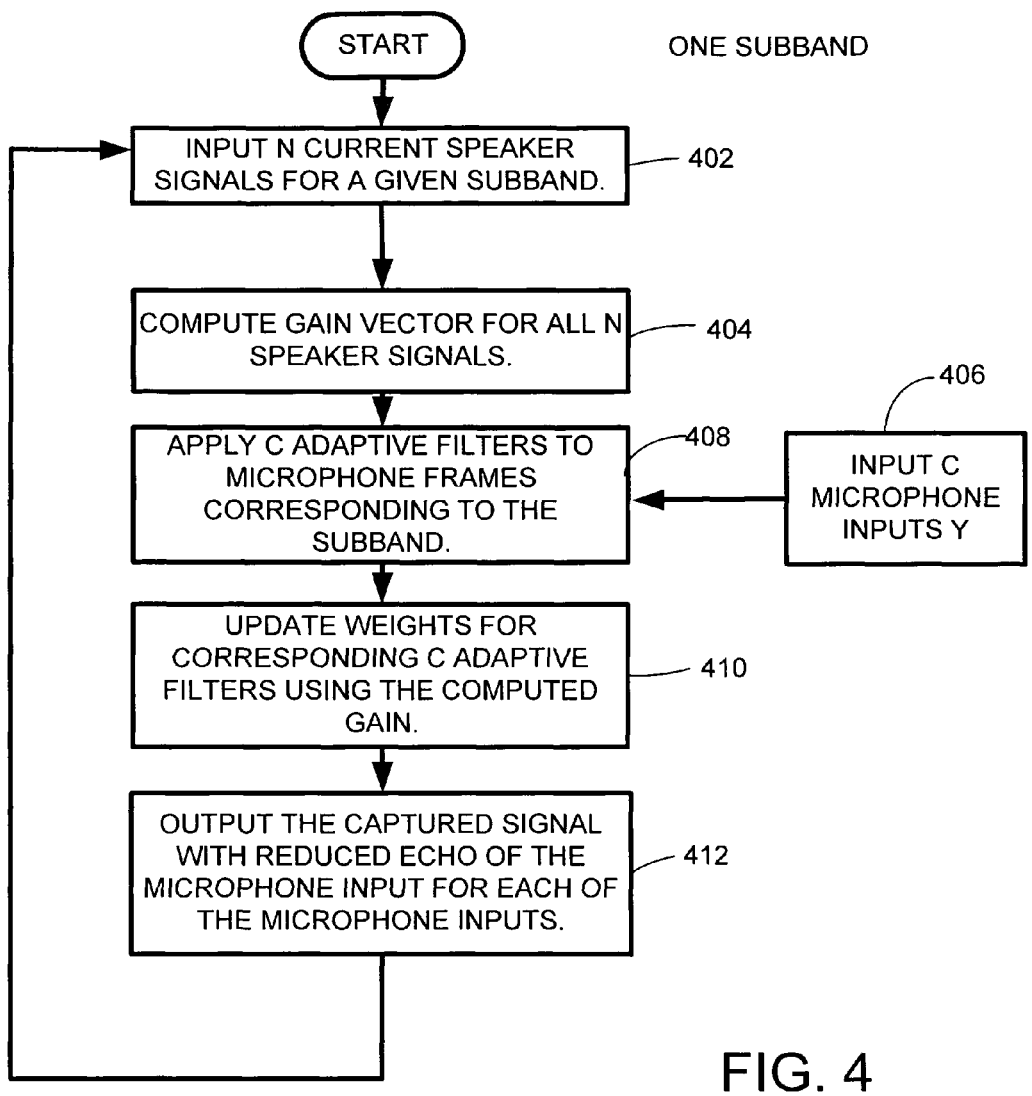
FIG. 4 is a more detailed flow diagram of the operation of the echo cancellation system of the invention for one subband.

A more detailed view of this the echo cancellation process described with respect to FIG. 3 is shown in FIG. 4 for a single subband. As shown in process action 402, N current speaker signals are input for a given subband. The gain vector is then computed for all N speaker signals (process action 404). C microphone inputs are input into the system, one for each microphone channel (process action 406). The adaptive filters are applied to the microphone frames corresponding to the given subband (process action 408). Finally, the weights corresponding to the C adaptive filters are updated using the gain vector (process action 410). Then the captured signal with reduced echo is output for each of the microphone inputs, as shown in process action 412. This process is then repeated for the next set of speaker signal frames.

Figure 5:
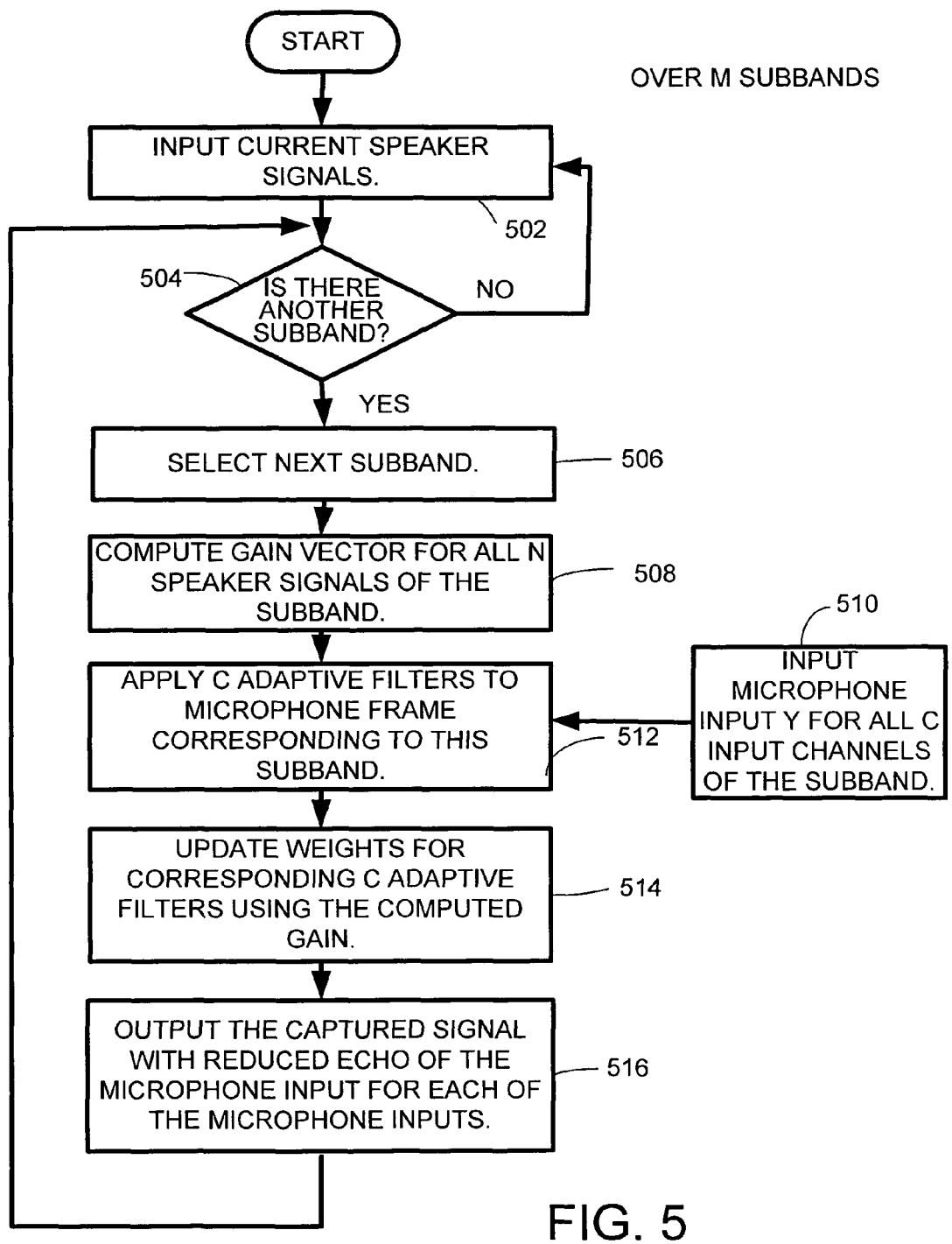
FIG. 5 is a more detailed flow diagram of the operation of the echo cancellation system of the invention for multiple subbands.

FIG. 5 shows the echo cancellation process of the invention performed over M subbands. As shown in process action 502, the current speaker signals are input. A check is made if there is another subband (process action 504). If there are no further subbands, the next set of speaker frames is input (process action 502). If there is, the next subband is selected (process action 506), and the gain vector for all N speaker signals of that subband is computed (process action 508). The gain vector is later used to update the adaptive filters. The microphone input for all C input channels of the subband are input (process action 510). The C adaptive filters are then applied to the microphone frames corresponding to the selected subband (process action 512). The weights for the corresponding adaptive filters are then updated (process action 514). Then the captured signal with reduced echo is output for each of the microphone inputs, as shown in process action 516, and a check is made as to whether there is another subband to process (process action 504). This process is then repeated for the next set of speaker signal frames.

2.4 Multi-Capture Channel Signal for Microphone Arrays.

Figure 6:
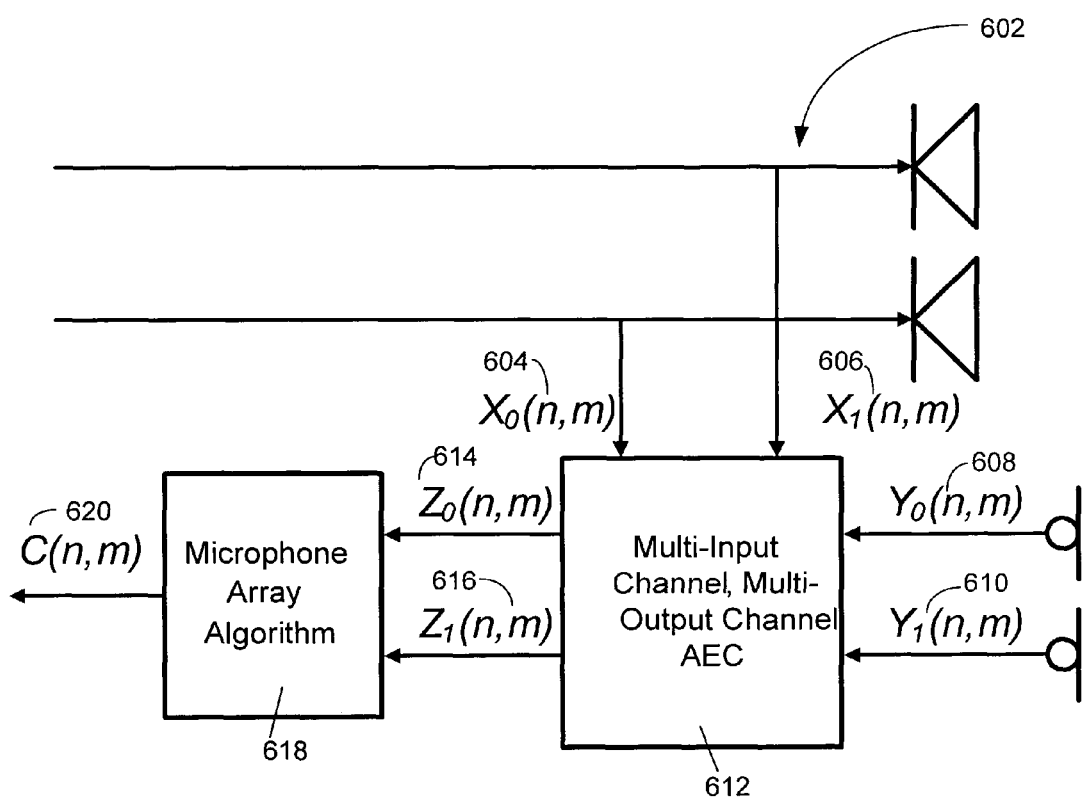
FIG. 6 illustrates a multi-capture channel, multi-playback channel acoustic echo cancellation (AEC) system architecture with a microphone array according to the invention.

A multi-capture channel, multi-playback channel AEC system architecture 602 with a microphone array is shown in FIG. 6. FIG. 6 shows a two-input two-playback example. Extensions of the system for more than two input channels and/or more than two playback channels is obvious to those skilled in the art.

The two output channels have been converted in to the frequency domain preferably using a transform such as the Fast Fourier Transform (FFT) or the Modulated Complex Lapped Transform (MCLT). For the nth frame, the mth subband of the stereo output channels or multiple playback channels are given by $X_0(n,m)$ 604 and $X_1(n,m)$ 606. Likewise, the frequency domain transforms of the two capture channels of a microphone array are given by $Y_0(n,m)$ 608 and $Y_1(n,m)$ 610. The multi-input channel, multi-output channel AEC module 612 produces the frequency domain outputs $Z_0(n,m)$ 614 and $Z_1(n,m)$ 616 which represent the $Y_0(n,m)$ 608 and $Y_1(n,m)$ 610 input signals with reduced echo, respectively. Finally, the microphone array algorithm module 618 combines $Z_0(n,m)$ and $Z_1(n,m)$ producing the frequency domain output C(n,m) 620 which can then be transformed back to the time domain. The microphone array algorithm can be any functional algorithm, as is known in the art. Examples of such algorithms include Delay-and-Sum, Minimum Variance Distortionless Response, and Beamsteering.

Figure 7:
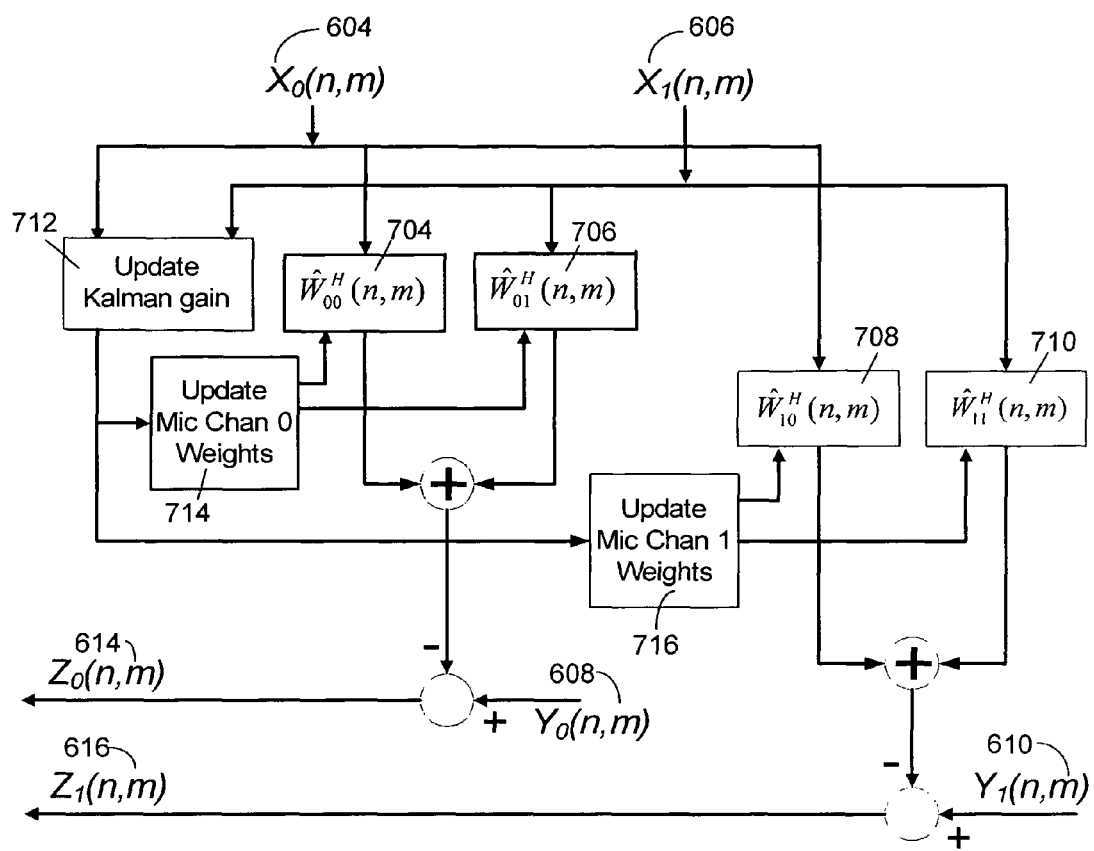
FIG. 7 illustrates the details of the Multi-Input Channel, Multi-Output Channel AEC block shown in FIG. 6.

The details of the multi-input channel, multi-output channel AEC module 612 in FIG. 6 are shown in FIG. 7. Referring to FIG. 7, the multi-input channel, multi-output channel AEC module 612 is configured as follows. The $X_0(n,m)$ 604 and $X_1(n,m)$ 606 subband signals from the multiple playback channels are input into the multi-input channel, multi-output channel AEC module 612. Although shown separately, the adaptive filters 704 and 706, along with the microphone update module 714, comprise a single adaptive filter for microphone channel 0. Likewise, the adaptive filters 708 and 710, along with the microphone update module 716, comprise a single adaptive filter for microphone channel 1. The $X_0(n,m)$ 604 input is input to the adaptive filters 704 and 708 and to the Update Kalman Gain module 712. Similarly, the $X_1(n,m)$ 606 playback signal is input to the adaptive filters 706 and 710 and to the Update Kalman Gain module 712. The Kalman gain vector is computed and the updated gain vector is used to update the weights of the microphone channel 0 adaptive filter, which are updated in the microphone update module 714, and the weights of the microphone channel 1 adaptive filter, which are updated in the microphone update module 716. The updated microphone channel 0 weights are transferred to the adaptive filters 704 and 706. Likewise, the updated microphone, channel 1 weights are transferred to the adaptive filters 708 and 720. The adaptive filters 704 and 706 are applied to the capture channel $Y_0(n,m)$ 608. Similarly, the output of adaptive filters 708 and 710 are applied to the capture channel $Y_1(n,m)$ 610. The process continues for subsequent capture and playback frames. At every step the current states of the adaptive filters 704, 706, 708, 710 are used to reduce the multi-channel output for each input. The captured signal with reduced echo $Z_0(n,m)$ 614, $Z_1(n,m)$ 616 for each of the microphone inputs, $Y_0(n,m)$ 608, $Y_1(n,m)$ 708, respectively, is output.

In one embodiment, separate recursive least squares (RLS) adaptive filters model the impulse responses from the two stereo output channels to each microphone input. Other types of adaptive filters can be used, however, such as NLMS or FRLS filters, for example. The details of the block in FIG. 7 of the Update Kalman Gain module are shown in FIG. 8 which will be discussed in more detail in the Section 2.5 below.

2.5 Computation of the Kalman Gain Vector K(n,m) and the Update for the Inverse Correlation Matrix P(n,m).

Figure 8:
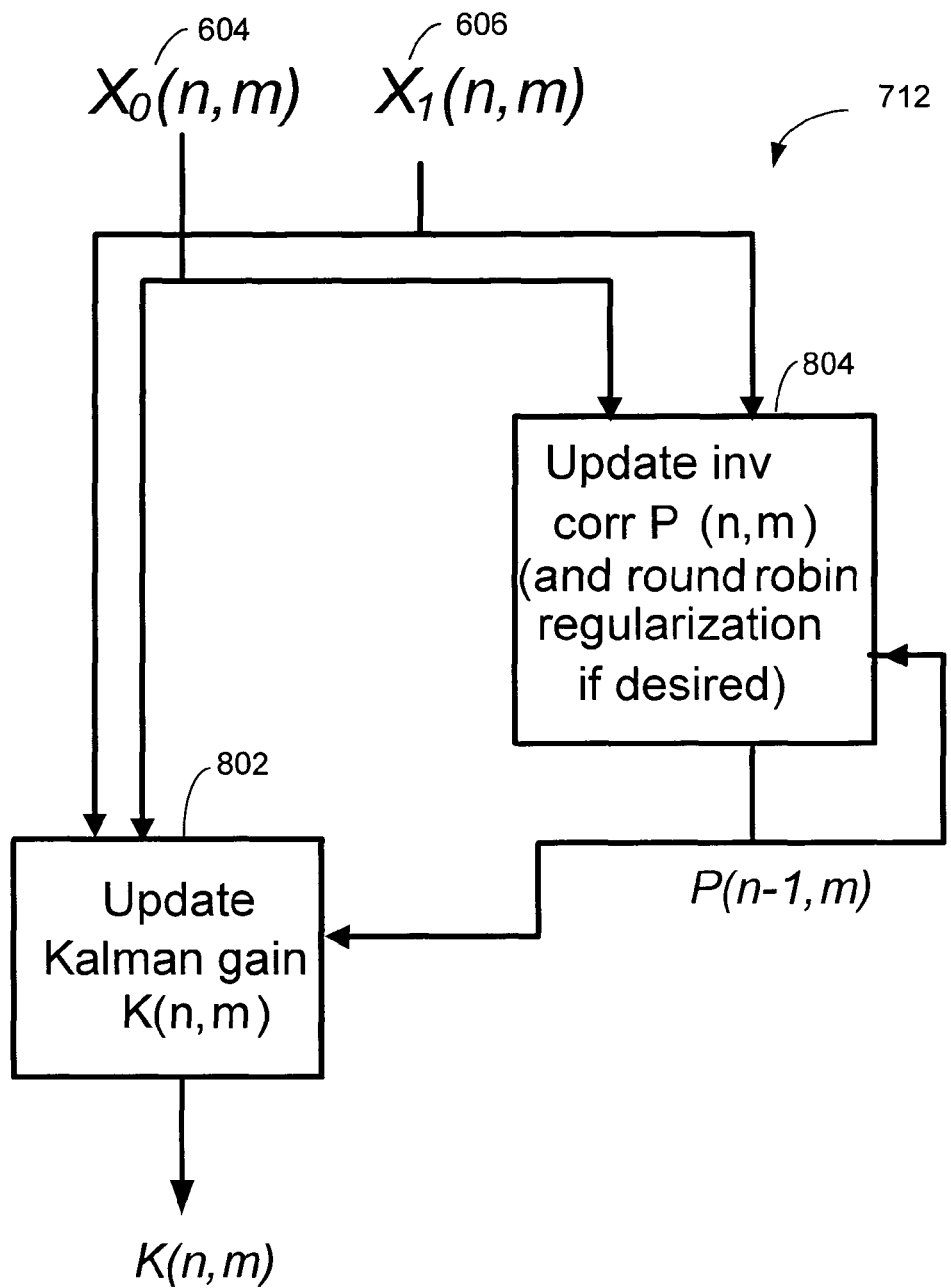
FIG. 8 provides the details of the Update Kalman Gain Block of FIG. 7.

As shown in FIG. 8, one important feature of the present invention is that computation of the Kalman gain vector, K(n,m), and the update for the inverse correlation matrix, P(n,m), are independent of the microphone signals, and can therefore be computed once regardless of the number of microphone channels. Likewise, K(n,m) can be computed once for multiple applications sharing the same playback device.

Figure 9:
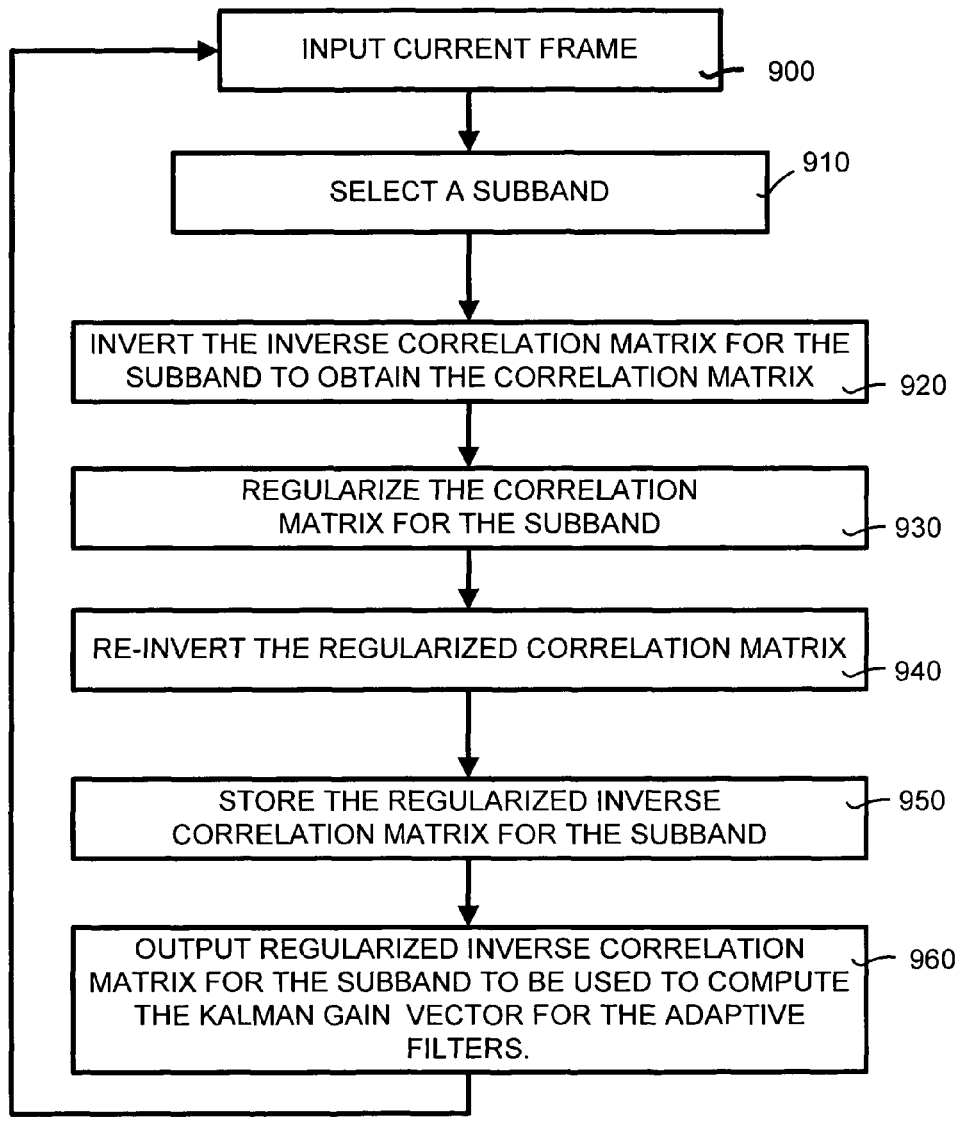
FIG. 9 provides a flow chart of round robin processing used in one embodiment of the system and method according to the invention.

As shown in FIG. 8, the speaker playback signals $X_0(n,m)$ 604 and $X_1(n,m)$ 606 are input into the Update Kalman Gain sub-module 802 and the Update Inverse Correlation Matrix sub-module 804 of the Update Kalman Gain module 712. The Update Inverse Correlation Matrix sub-module 804 computes the updated inverse correlation matrix which is used in the Kalman gain vector computation of the Update Kalman Gain sub-module 802 and is also stored in the Update Inverse Correlation Matrix sub-module 804. Round round regularization can also be computed in the Update Inverse Correlation Matrix sub-module 804 if desired, as shown in FIG. 9 and discussed below. The Update Kalman Gain sub-module 802 computes the updated gain vector using the last input inverse correlation matrix.

2.6 Mathematical Description.

Mathematically, the method is described as:

---

//Initialize the inverse correlation matrix for each subband and the weight vector for
// each microphone channel.
for each subband m = 0 ... M−1,
    P(0,m) = $\delta^{-1}$I
    for each microphone channel c = 0 ... C−1
        $\dot{W}$(c,1,m) = 0
    end
end
// Initialize the Round Robin Count.
RoundRobinCount = 0
for each frame n = 1, 2, ...
    for each subband m = 0 ... M−1, compute
        // Update the Kalman gain vector and the inverse correlation matrix
        // for each frame in each subband.

$$K(n,m) = \frac{\lambda^{-1}P(n-1,m)X(n,m)}{1 + \lambda^{-1}X^H(n,m)P(n-1,m)X(n,m)}$$

P(n,m) = $\lambda^{-1}$P(n−1,m) − $\lambda^{-1}$K(n,m)$X^H$(n,m)P(n−1,m)
If (m == RoundRobin Count)
    R(n,m) = $P^{-1}$(n,m)
    R(n,m) = R(n,m) + $\beta_{RLS}$I -continued

```
    P(n,m) = R⁻¹(n,m)
  end
  // Implement the echo canceller and update the taps
  // weights for each microphone channel.
  for each microphone channel c = 0 ... C−1, compute
    ξ(c, n,m) = Y(c,n,m) − Ŵᴴ (c,n,m)X(n,m)
    Ŵ(c,n + 1,m) = Ŵ(c,n,m) + K(n,m)ξ*(c,n,m)
  end
end
RoundRobin Count = RoundRobin Count + 1
if (RoundRobin Count == MaxRoundRobin Count)
  RoundRobin Count = 0
end
end
``` where $(\cdot)^H$ is the Hermitian or conjugate transpose of a matrix, $\hat{W}(n,m)$ tap weight vector of the signal correlation matrix, $\delta$ is a small constant, I is the identity matrix, K(n,m) is the multichannel Kalman gain vector, C is the number of playback channels, L is the filter length in the subband, $$X(n,m) = [X(n,m,0) \ldots x(n,m,C-1) X(n-1,m,0) \ldots X(n-L+1,m,C-1)]^T$$

is the multi-channel speaker input vector, P(n,m) is the inverse of the input speaker signal correlation matrix R(n,m), $$R(n, m) = \sum_{i=0}^{n} \lambda^{n-i} X(n, m) X^H(n, m)$$

$\lambda$ is the exponential forgetting factor, Y(c,n,m) is the microphone signal, $\xi$ is the error signal between the microphone signal and the echo estimate, $\xi^*$ is the conjugate of the error, RoundRobinCount is used to select the next band to regularize, MaxRoundRobinCount is the maximum number of bands to regularize and $\beta_{RLS}$ is the regularization factor.

2.7 Round Robin Scheme.

In general, the round robin scheme as used in the multi-input channel, multi-output channel echo cancellation method ensures that each subband in the system is selected so that the adaptive filter's inverse correlation matrix for that subband can be regularized. Alternatively, the adaptive filter's inverse correlation matrix can be examined to determine whether regularization is necessary at that time. The round robin scheme is used to make sure that each subband is examined on a regular basis in order to prevent the inverse correlation matrix from diverging.

The round robin scheme may be implemented in a variety of different ways. By way of example, and not limitation, a round robin scheme can be described as where a single subband is regularized each frame. Alternatively, the round robin scheme may include regularizing several or even all subbands per frame. In another implementation, the round robin scheme may include regularizing one subband every several frames. Depending on the actual round robin scheme implemented, a counter that is pointing to the current subband being examined is updated to point at the next subband or group of bands being examined and reset back to the first band if necessary.

FIG. 9 is a general flow diagram illustrating an exemplary implementation of a round robin scheme as performed in the Update Inverse Correlation Module 804. As shown in FIG. 9, the round robin scheme begins by inputting a current frame (process action 900). One subband is then selected for regularization (process action 910). In this embodiment, each subband is selected in turn as a new current frame is input. However, in alternative embodiments, a single subband may only be selected every few frames, or several subbands may be selected per frame.

The inverse correlation matrix for the selected subband is inverted to obtain the correlation matrix for the selected subband (process action 920). The correlation matrix is then regularized (process action 930). In an alternative embodiment, process action 930 first examines the correlation matrix to determine whether it needs to be regularized, and then regularizes only when necessary. Next, the regularized correlation matrix is re-inverted (process action 940), and the regularized inverse correlation matrix for the selected subband is stored (process action 950). This result is later used to update the Kalman gain vector for next frame of the playback signals (process action 960). Control then flows back to process action 900, which obtains the next current frame 2.8 Multi-Channel AEC Architecture for Multiple Applications Running AEC Simultaneously.

Figure 10:
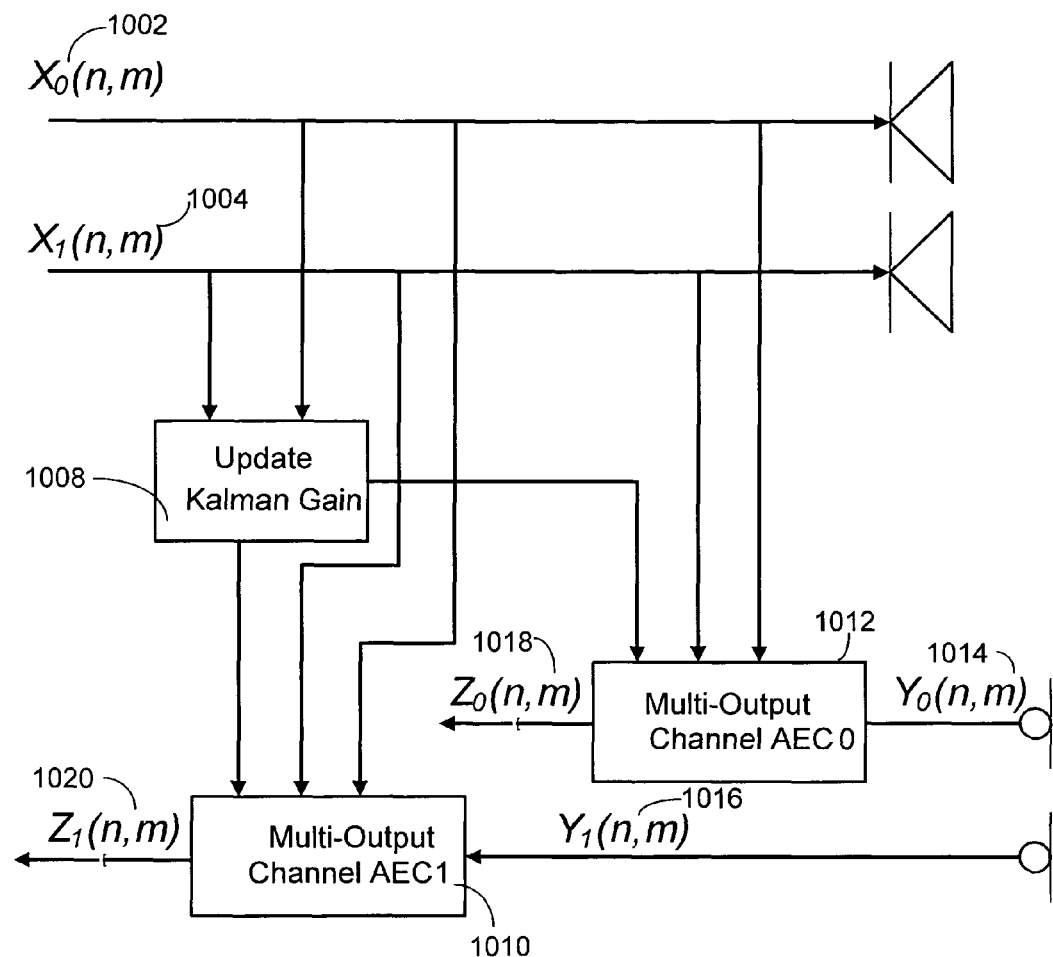
FIG. 10 illustrates the system architecture for multiple applications with acoustic echo cancellation sharing a single output device.

Similar to extending the multi-output channel AEC to handle multi-input channel microphone arrays, the system and method of the invention employs the same idea to improve the system AEC architecture so that the Kalman gain vector and inverse correlation matrices are only updated once for each output device. As a result, separate copies of the updated Kalman gain vector can then be sent to individual applications thereby significantly reducing the system's overall CPU computation for multi output channel AEC. This idea is shown in FIG. 10. Again, the details of the block "Update Kalman Gain" are given in FIG. 8. In addition, the details of the block "Multi Output Channel AEC" are given in FIG. 11. Although separate applications capturing single channel data from separate microphones are shown in FIG. 10, the improved system architecture is also applicable to scenarios where one or more of the applications capture multi-input channel data from a microphone array as shown in FIG. 6. In addition, the architecture is applicable to the scenario where the multiple capture applications capture data from a single microphone or microphone array, and the data is copied to both applications' multi-output channel AEC modules. This architecture has the advantage that the separate applications may want to initialize their individual AEC algorithm with different parameters settings as well as post-processing the AEC's output signal with other algorithms such as center clipping, noise suppression, or automatic gain control.

As shown in FIG. 10, the speaker playback signals $X_0(n,m)$ 1002 and $X_1(n,m)$ 1004 are input into the Update Kalman Gain module 1008 and the Multi-Output Channel AEC 0 module 1012 and the Multi-Output Channel AEC 1 module 1010, respectively. The Multi-Output Channel AEC 0 module 1012 and the Multi-Output Channel AEC 1 module 1010 are used to process the capture channels $Y_0(n,m)$ 1014 and $Y_1(n,m)$ 1016, respectively, to produce the captured signal with reduced echo $Z_0(n,m)$ 1018, $Z_1(n,m)$ 1020 for each of the microphone capture channels.

Figure 11:
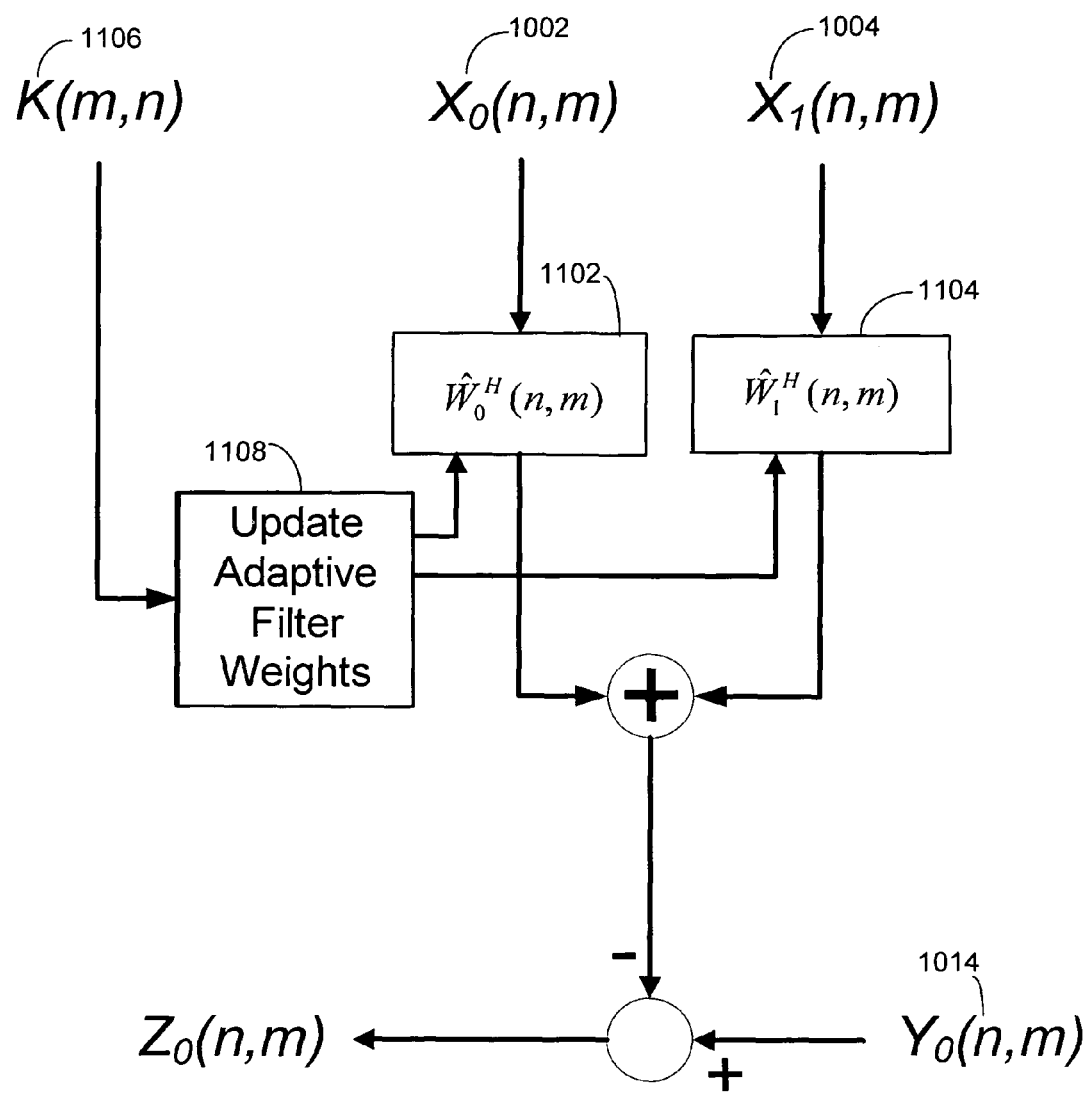
FIG. 11 provides the details of the "Multi Output Channel AEC" block in FIG. 10.

By way of example, for one of the multi-output channel AECs, the details of the multi-output channel AEC module 1010 shown in FIG. 10 are shown in FIG. 11. Referring to FIG. 11, the $X_0(n,m)$ 1002 and $X_1(n,m)$ 1004 subband signals from the multiple playback channels are input into the multi-output channel AEC module 1010. The $X_0(n,m)$ 1002 playback signal is input to the adaptive filter 1102 and the $X_1(n,m)$ 1004 playback signal is input to the adaptive filters 1104. The Kalman gain vector 1106 is used to update the adaptive filter weights for the adaptive filters 1102 and 1104 via the Update Adaptive Filter Weights module 1108. The output of the adaptive filters 1102 and 1104 are summed to produce the echo estimate and subtracted from the capture channel $Y_0(n,$ m) 1014. The captured signal with reduced echo $Z_0(n,m)$ 1018 for the microphone input $Y_0(n,m)$ 1014 is output. The process repeats for all subsequent frames of data. At every step the current states of the adaptive filters 1102,1104 are used to reduce the multi-channel output for the input.

The foregoing description of the multi-input channel and multi-output channel echo cancellation system and method has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments. It is intended that the scope of the invention be limited not by this detailed description, but rather by the claims appended hereto.

What is claimed is:

1. A system for canceling acoustic echoes for multiple inputs, comprising:
   a plurality of a number of C of microphone inputs;
   a plurality of a number of N of speaker playback signals, each decomposed into a plurality a number of M of subbands;
   a plurality of adaptive filters, equal to the number of microphone inputs C times a number of subbands M, whose outputs are used to reduce echo in the plurality of microphone inputs, wherein each adaptive filter comprises a weight update, and wherein each adaptive filter processes N speaker playback signals; and
   a single gain computation module for each subband M employed to compute a gain vector to be used in computing the weight update of said plurality of adaptive filters equal to the number of microphone inputs C times a number of subbands M, wherein the length of the gain vector depends on the number of speaker playback signals N, and wherein the reduced echoes in the plurality of microphone inputs are computed by multiple applications and wherein several copies of the updated gain vector for each subband are sent to each of the applications.

2. The system of claim 1, wherein the plurality of adaptive filters comprises recursive least squares (RLS) adaptive filters.

3. The system of claim 1, wherein the plurality of adaptive filters comprises fast recursive least squares (FRLS) adaptive filters.

4. The system of claim 1, wherein the plurality of adaptive filters comprises normalized least mean squares (NLMS) adaptive filters.

5. The system of claim 1 wherein the gain computation is independent of the plurality of the microphone inputs.

6. A method for canceling acoustic echoes for multiple inputs, comprising:
   decomposing each of a plurality of a number N of speaker playback signals into a plurality M of subband signals;
   computing a single gain vector for all N speaker playback signals of each subband;
   inputting a plurality of a number C of microphone inputs;
   applying a plurality of adaptive filters to the plurality of subband signals and the plurality of C microphone inputs using said single gain for each subband, wherein each of the plurality of adaptive filters is selected in a round robin sequence and an inverse correlation matrix of each selected adaptive filter is regularized;
   reducing the echo in the plurality of C microphone inputs using the outputs of the plurality of adaptive filters.

7. The method of claim 6 wherein computing a single gain vector for all N speaker signals of each subband, comprises:
   using a stored inverse correlation matrix and the plurality N of speaker playback signals each decomposed into a plurality of a number M of subband signals to compute the gain vector; and
   updating the inverse correlation matrix; and
   storing the updated inverse correlation matrix to be used for subsequent gain vector computations.

8. The method as set forth in claim 6, wherein regularizing further comprises ensuring that the plurality of adaptive filters are stable.

9. The method of claim 6, wherein the plurality of adaptive filters comprises recursive least squares (RLS) adaptive filters.

10. The method of claim 6, wherein regularizing the inverse correlation matrix comprises:
    inverting the inverse correlation matrix to produce a correlation matrix;
    regularizing the correlation matrix to produce a regularized correlation matrix; and
    obtaining a regularized inverse correlation matrix by inverting the regularized correlation matrix.

11. The method of claim 6, wherein applying a plurality of adaptive filters comprises:
    adapting a weight vector for each of the plurality of adaptive filters;
    de-aggregating the weight vector to produce a plurality of single-channel filter coefficient vectors such that there is one single-channel filter coefficient vector for each playback channel; and
    applying the plurality of single-channel filter coefficient vectors to the plurality of subband signals.

12. The method of claim 6, wherein the captured signal comprises an acoustic signal.

13. The method of claim 6, wherein the captured signal comprises an electrical signal.

14. The method of claim 6, wherein the plurality of playback signals is a stereo signal.

15. A computer-readable medium having computer-executable instructions for performing the method recited in claim 6.

16. A computer-implemented method for eliminating echoes of a plurality of playback signals in a captured signal, comprising:
    decomposing a plurality of playback signals into subbands;
    computing a single gain vector for all speaker playback signals each subband using inverse correlation matrices, wherein the gain vector for each subband and the inverse correlation matrices are independent of the captured signal;
    processing the subbands using an adaptive filter for each of the subbands using the gain vector computed for the subband; and
    reducing echoes in the captured signal using the outputs of the adaptive filters, wherein the reduced echoes in the captured signal are computed by multiple applications and wherein several copies of the updated gain vector for each subband are sent to each of the applications.

17. The computer-implemented method of claim 16, wherein more than one captured signal is input.

18. The computer-implemented method of claim 16 wherein the gain vector for each subband and the inverse correlation matrices are only updated once for a given output device.

* * * * *